United States Patent [19]
Frey

[11] 4,141,376
[45] Feb. 27, 1979

[54] DIGITAL SERVOVALVE DRIVE

[75] Inventor: Daniel J. Frey, Mason, Ohio

[73] Assignee: General Electric Company, Lynn, Mass.

[21] Appl. No.: 812,029

[22] Filed: Jun. 29, 1977

[51] Int. Cl.² .................... F15B 5/00; F16P 5/00; G05D 16/20
[52] U.S. Cl. ........................... 137/83; 328/58; 307/265; 328/69
[58] Field of Search ............... 307/265; 328/48, 58, 328/37, 69; 91/459, 461; 137/83

[56] References Cited

U.S. PATENT DOCUMENTS

| | | | |
|---|---|---|---|
| 3,668,560 | 6/1972 | Padalino et al. | 307/265 X |
| 3,697,879 | 10/1972 | Holliday | 307/265 X |
| 3,836,858 | 9/1974 | Kitano | 328/58 |
| 3,874,407 | 4/1975 | Griswold | 91/459 |
| 4,001,699 | 1/1977 | Denny et al. | 328/37 X |

*Primary Examiner*—John S. Heyman
*Attorney, Agent, or Firm*—Derek P. Lawrence; Henry J. Policinski

[57] ABSTRACT

A digital system for producing a bipolar rectangular waveform of fixed frequency having a duty cycle proportional to the magnitude of an input digital word is provided to drive a servovalve. The digital word is input to a modulator which outputs a fixed frequency rectangular waveform whose duty cycle varies from 0 to 100% dependent upon the magnitude of the digital word. In order to adapt this output to drive a fail-fixed servovalve in which maximum flow occurs at a predetermined portion of maximum rated current, a scaling network is provided which limits the variation in the duty cycle of the output square wave.

9 Claims, 3 Drawing Figures

DIGITAL SERVOVALVE DRIVE

This invention was made in the course of a contract, subcontract or grant with the United States Air Force.

BACKGROUND OF THE INVENTION

This invention relates to a current drive circuit for a servovalve and more particularly to a current drive circuit for a servovalve which produces a fixed frequency bipolar rectangular waveform having a duty cycle dependent upon the magnitude of an input digital word. Servovalves of the electrohydraulic type have been used broadly as the interface between an electrical control signal and different types of actuating and metering devices. One such application is in fuel control systems for gas turbine engines. Typically in such fuel control systems there is an electrical signal generated by the control which corresponds to the difference between a reference engine speed and the operating engine speed. This electrical signal is connected to the input of a servovalve which controls a servopiston which in turn is mechanically coupled to a fuel metering valve. In this manner, fuel flow of the gas turbine engine is varied as a function of the electrical signal in order to maintain the reference engine speed. Such a system provides a highly stable and accurate control of engine speed. Today's applications for servovalves, particularly in gas turbine engines, demand that the servovalve be fail-fixed. By fail-fixed, it is meant that the mechanical output of the servopiston, as may be provided by an actuator, will be locked in place immediately following a loss of either the electrical input signal or the hydraulic lines.

One such fail-fixed servovalve is disclosed in U.S. Pat. No. 3,922,955 issued to Howard B. Kast on Dec. 2, 1975, and assigned to the assignee of this invention. The servovalve disclosed in the Kast patent includes a flexible jet pipe for ejecting a stream of pressurized liquid into a receiver passage disposed within a chamber. The direction of deflection of the jet pipe is controlled by a torque motor having an armature secured to the jet pipe so as to exert a bending moment thereon. The servomotor in turn is activated by current drive signals. As more fully described in the above-referenced Kast patent, the directon and amount of deflection of the jet pipe is dependent upon the polarity and magnitude respectively of the input current drive signal and the servopiston is disposed so as to remain in the position it was in at the time of failure in the event of a complete loss of the driving current or of a hard over failure of the driving current.

The present invention is directed to an improved driving circuit for a fail-fixed servovalve of the type disclosed in the above-referenced Kast patent which is adapted to interface with digital control circuitry. Prior art circuits of this type have generally included several analog components, (e.g., sample and hold circuits) and have exhibited undesired inaccuracies due to drift of such analog components.

OBJECT OF THE INVENTION

It is therefore a primary object of this invention to provide a digital driving circuit for a fail-fixed servovalve.

It is a further object of this invention to provide a digital driving circuit for a fail-fixed servovalve which outputs a bipolar rectangular waveform of fixed frequency and which has a duty cycle proportional to the magnitude of an input digital word.

A still further object of this invention is to provide a digital driving circuit for a fail-fixed servovalve whose duty cycle may be scaled to match the rated current of the servovalve.

SUMMARY OF THE INVENTION

These and other objects of the invention have been achieved in the preferred embodiment of the invention wherein a digital system for producing a bipolar rectangular waveform of fixed frequency having a duty cycle proportional to the magnitude of an input digital word is provided to drive a servovalve. The digital word is input to an output modulator which outputs a fixed frequency rectangular waveform whose duty cycle varies from 0 to 100% dependent upon the magnitude of the digital word. In order to adapt this output to drive a fail-fixed servovalve in which maximum flow occurs at a predetermined portion of maximum rated current, a scaling network is provided which limits the variation in the duty cycle of the output square wave. An embodiment for limiting duty cycle variation to between 25% and 75% is disclosed. The rectangular waveform is thereafter input to a switched current source of the type which outputs a constant current so long as the signal on its input remains high. The current output from the constant source is used to drive the fail-fixed servovalve.

DESCRIPTION OF THE PREFERRED EMBODIMENT

Figure 1:
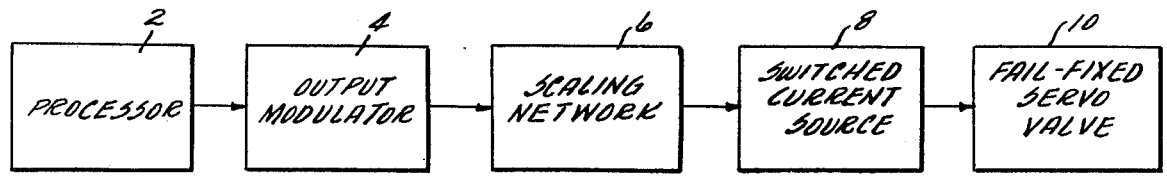
FIG. 1 is a schematic diagram in block format of the digital servovalve drive system of this invention.

Referring to FIG. 1 therein is shown a schematic diagram in block format of the digital servovalve drive system of this invention. A digital word from the processor 2 is input to an output modulator 4 which outputs a fixed frequency rectangular waveform whose duty cycle varies from 0 to 100% to a scaling network 6. Scaling network 6 limits variation in the duty cycle of the received square wave so that the driving current applied to the fail-fixed servovalve 10 does not cause it to exceed its maximum flow rate. The bipolar waveform output from the scaling network 6 is input to a switched current source 8 which drives the fail-fixed servovalve 10. Switched current source 8 is of the type well known in the art which outputs a constant negative current as long as the signals received at its input remain positive and a constant positive current as long as the signals received at its input remain negative.

Figure 2:
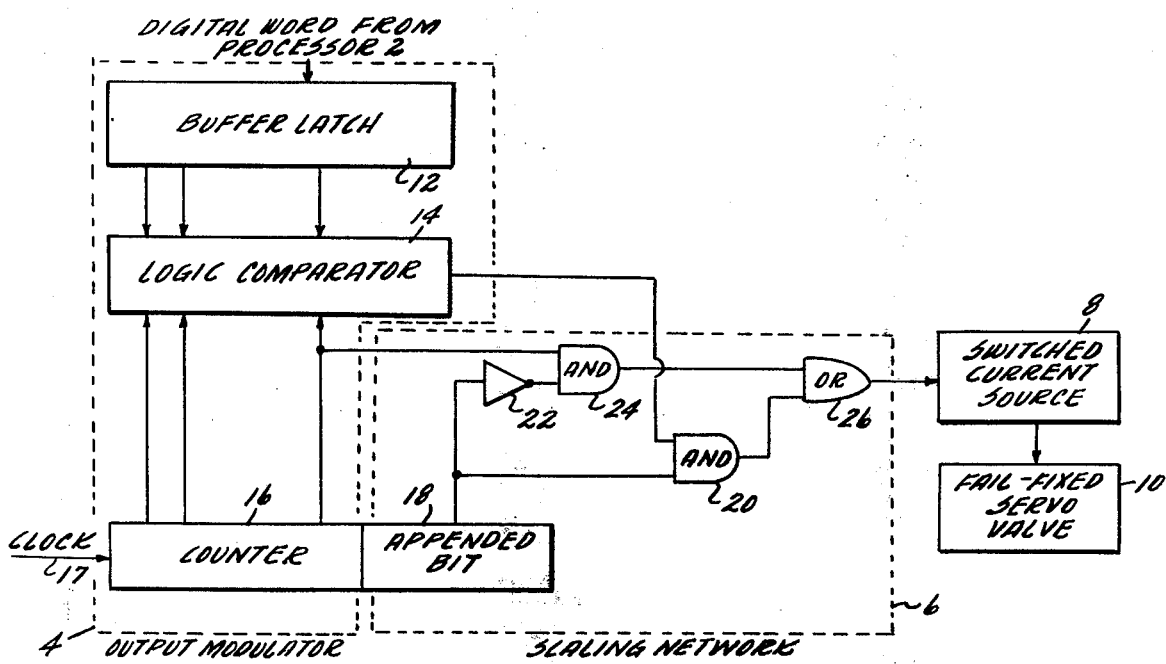
FIG. 2 is a schematic diagram partially in block format illustrating details of the output modulator and scaling network used in the digital servovalve drive system of this invention.

Referring to FIG. 2 there is shown in further detail the components of modulator 4 and scaling network 6. The digital word from the processor 2 is input through a buffer latch 12 to a logical comparator 14. The logical comparator 14 compares this input digital word to the output of a free-running counter 16 stepped by signals from a clock 17 and maintains its output high as long as the contents of the counter 16 are less than the value of the digital word held in buffer latch 12. When the contents of the counter exceeds the value of the digital word held in buffer latch 12, the output of the logical comparator 14 goes low. The counter 16 then continues to its maximum count and thereafter rolls over to all zeros beginning this process again.

Figure 3:
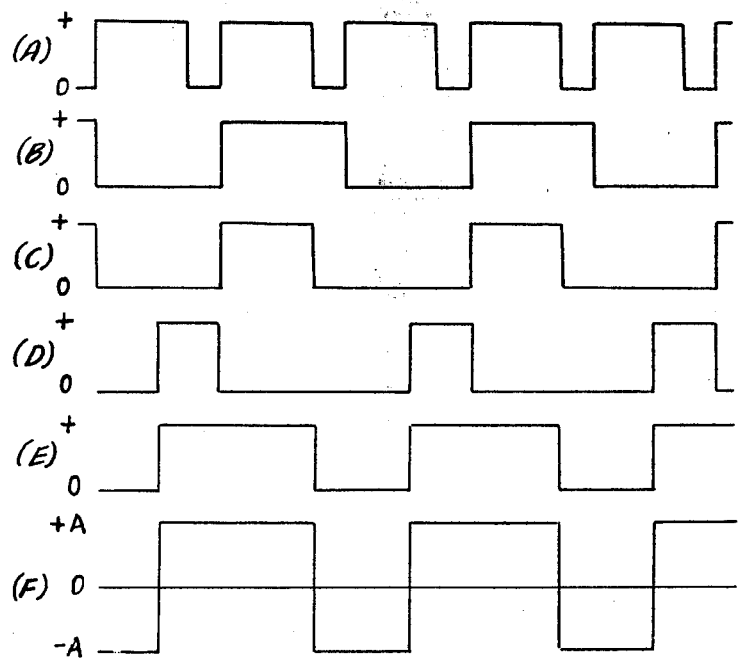
FIG. 3 is a timing diagram for the digital servovalve drive system of this invention.

Referring to FIG. 3, therein is shown a timing diagram for the servovalve drive system of this invention. The waveform A illustrates the fixed frequency rectangular voltage output from the logic comparator 14. The duty cycle of the waveform A will vary between 0 and 100% depending on the magnitude of the digital word input from the processor 2. It being recognized that when the magnitude of the digital word input from the processor 2 equals the maximum obtainable count in the counter 16, the corresponding waveform output from the logical comparator 14 will have a duty cycle of 100% and similarly when the digital word input from the process 2 is all zeros the output waveform from the logical comparator 14 will have a duty cycle of 0%. The waveform A as illustrated in FIG. 3 corresponds to a digital word equal to 75% of the maximum obtainable count in the counter 16.

The waveform output from the logic comparator 14 may be input directly to the switched current source 8. However for a fail-fixed servovalve, where maximum flow occurs generally at a fraction of maximum current, it is necessary to limit the variation and duty cycle of the waveform output from the logic comparator 14 (for example, for a fail-fixed servovalve 10 in which maximum flow occurs at one-half rated maximum current, it is necessary to limit the duty cycle of the waveform output from logic comparator 14 to between 25% and 75%. This is accomplished by appending an extra bit 18 to the counter 16 and using it to gate every other output pulse from the logic comparator 14 through an AND gate 20. The output of the appended bit 18 and the AND gate 20 in relation to the output of the logic comparator 14 is shown as waveforms B and C respectively in the timing diagram of FIG. 3. The output from the appended bit 18 and the most significant bit (MSB) of the counter 16 is used to generate a 25% duty cycle waveform by inputing the output of appended bit 18 through an invertor 22 to an AND gate 24 and inputing the most significant bit of counter 16 to the AND gate 24. The output of the AND gate 24 is input to an OR gate 26, which also receives as an input, the output of AND gate 20. The resultant waveforms in relation to the output of the logic comparator 14 is shown in the timing diagram of FIG. 3, where the D waveform illustrates the output of AND gate 24, the C waveform illustrates the output of AND gate 20, and the E waveform illustrates the output of OR gate 26. As can be seen from examination of the timing diagram of FIG. 3, the duty cycle of the waveform output from OR gate 26 will vary between 25% and 75% dependent upon the magnitude of the digital word input to the logic comparator 14. The output from OR gate 26 is input to the switiched current source 8, which generates a constant driving current to the servovalve 10 as long as the signal of its input remains high. The output of the switched current source is illustrated as the F waveform of FIG. 3.

As will be apparent by those skilled in the art, the scaling network 6 can be modified to provide any desired variation in duty cycle between 0 and 100% by proper choice of the logic components for the scaling network 6. Further, the accuracy of resolution and frequency of the driving waveform output from the logic comparator 14 may be set to any desired level by proper choice of the frequency of the external clock 17 and the number of bits in the counter 16 and logic comparator 14.

In a conventional servovalve driving circuit, the current source is controlled by voltage derived from a digital word by means of a digital to analog convertor. Failure of the convertor circuit may allow a voltage of indeterminate value to be applied to the input of the current source resulting in a non-zero value of driving current applied to the valve. For fail-fixed servovalve, using the driving circuit of this invention, failure of the logic elements will result in either a logic zero or a logic one applied at the input of the switched current source 8. This would result in a hard-over signal at the output of switched current source 8, driving the flow of the servovalve 10 to zero.

What is claimed is:

1. A circuit for generating a driving current for a servovalve in response to a received digital word comprising:

output modulator means for receiving the digital word and outputing a fixed frequency rectangular waveform which transitions between low and high and which has a duty cycle proportional to the magnitude of the digital word; and bipolar switched current source means for receiving the rectangular waveform and adapted to output a positive and negative driving current to the servovalve.

2. The circuit of claim 1 further comprising:

scaling network means disposed intermediate the output modulator means and the switched current source means for limiting variation in the duty cycle of the rectangular waveform.

3. The circuit of claim 1 wherein the output modulator means comprises:

buffer latch means for storing the received digital word, free-running counter means for accumulating a count up to a maximum count and thereafter recycling from a zero count, clock means for stepping the counter means, and logic comparator means for comparing the digital word stored in the buffer latch means to the count accumulated in the counter means, maintaining a high output so long as the count exceeds the magnitude of the digital word and maintaining a low output so long as the digital words is equal to or less than the count.

4. The circuit of claim 3 wherein the duty cycle of the square wave is varied between 0% and 100%.

5. The circuit of claim 3 further comprising:

scaling network means disposed intermediate the output modulator means and the switched current source means for limiting variation in the duty cycle of the rectangular waveform.

6. The circuit of claim 5 wherein the scaling network means limits variations in the duty cycle of the square wave to between 25% and 75%.

7. The circuit of claim 6 wherein the scaling network means comprises:

an extra bit appended to the most significant bit position of the counter means, an inverter having an input connected to the appended bit, a first AND gate having a first input connected to the output of the inverter and a second input connected to the most significant bit position of the counter, a second AND gate having a first input connected to the appended bit and a second input connected to the output of the comparator means, and an OR gate having a first input connected to the output of the first AND gate, a second input connected to the output of the second AND gate and an output connected to the switched current source.

8. The circuit of claim 1 wherein the switched current source means outputs to the servovalve a constant positive current during those periods the rectangular waveform remains high and a constant negative current during those periods the rectangular waveform remains low.

9. In combination with a servovalve having a deflectable jet pipe for ejecting a stream of pressurized liquid into a receiver passage wherein the direction and amount of deflection of said jet pipe is dependent upon the polarity and magnitude respectively of an input driving current, an improved drive current generating means comprising:

output modulator means for receiving a digital word and outputting a fixed frequency rectangular waveform which transitions between low and high and which has a duty cycle proportional to the magnitude of the digital word; and bipolar switched current source means for receiving said rectangular waveform and adapted to output a positive and negative current in response thereto the direction and amount of deflection of said jet pipe being varied in response to said output current.

* * * * *